United States Patent Office 3,297,791
Patented Jan. 10, 1967

3,297,791
BLENDS OF VINYL CHLORIDE RESIN WITH A GRAFT OF BUTADIENE, ACRYLONITRILE AND DIVINYL BENZENE ONTO POLYVINYL CHLORIDE
John Michael Heaps, Colchester, Essex, England, assignor to B. X. Plastics Limited, London, England
No Drawing. Filed July 22, 1963, Ser. No. 296,444
Claims priority, application Great Britain, July 25, 1962, 28,660/62
5 Claims. (Cl. 260—876)

Our copending application Number 27,130/60 (Serial No. 932,852) describes a process for the manufacture of thermoplastic compositions having improved impact strength. These compositions comprise a blend of (1) a vinyl chloride homopolymer or a vinyl chloride copolymer (that is, a copolymer of a major proportion of vinyl chloride with one or more other copolymerisable monomers) and (2) a certain type of graft copolymer, especially a polyvinyl chloride graft copolymer, for example, of the type described in French Patent No. 1,309,809. Our copending application is concerned, more especially, with blends of polyvinyl chloride or a vinyl chloride copolymer obtained from a monomer mixture containing preferably more than 80% by weight of polyvinyl chloride, with graft copolymers which are prepared by grafting a conjugated diolefine and at least one copolymerisable vinyl monomer on to a halogen-containing trunk polymer, especially polyvinyl chloride, prepared in a separate operation. The ratio of the components in the grafts is preferably such that the weight of the grafted monomers is within the range 10 to 70 percent by weight of the total weight of the grafted products and the weight of the graft copolymer (2) in these blends is advantageously less than that of the vinyl chloride homopolymer or copolymer (1).

It will be appreciated that the properties of these blends are determined partly by the type of vinyl chloride homopolymer or copolymer and partly by the type and amount of the graft copolymer. Thus it is observed that vinyl chloride homopolymers or copolymers containing more than 95 percent by weight of vinyl chloride having high Fikentscher K-values are particularly suitable for the manufacture of high impact strength blends. As examples of these types of homopolymer and copolymer there may be mentioned Geon III (trademark of British Geon Limited) and Corvic R65/81 (trademark of I.C.I. Limited) respectively.

Now it is well known that compositions containing a large proportion of such vinyl chloride homopolymers or copolymers are not easy to flux, for instance, on a two roll mill and moreover when fluxed have a high melt viscosity. It is not surprising therefore that blends based on these vinyl polymers are difficult to process because of the need to maintain the compositions at elevated temperatures during manipulation. The utility of such compositions is moreover restricted and certain types of processing, for example blow moulding to large blowing ratios are precluded.

Attempts to reduce the melt viscosity of compositions of the type described above, for example, by adding small proportions of a plasticiser for polyvinyl chloride or including copolymers of vinyl chloride (for instance, copolymers obtained from monomer mixtures containing up to 10% by weight of vinyl acetate) in the blends, give products which are inferior in impact resistance, rigidity or resistance to chemical reagents. Alternatively the use of a low K-value vinyl chloride homopolymer, for example Corvic H55/34, may give blends which have an impact resistance only slightly superior to that of unplasticised polyvinyl chloride.

The present invention is based on the surprising observation that certain types of graft copolymer prepared by grafting with a mixture of monomers including a divinyl monomer are particularly suitable for blending with low K-value vinyl chloride polymers to give high impact compositions which by virtue of their relatively low melt viscosity are readily processed by the conventional techniques of, for example, calendering, extrusion, injection and blow moulding applied to unplasticised vinyl chloride polymers. These same grafts can also be advantageously used in blends with high K-value vinyl chloride polymers and copolymers to give high impact strength compositions which can be processed more readily than the unblended polymer or copolymer.

The present invention therefore provides a polymer blend comprising (1) a vinyl chloride homopolymer or a copolymer obtained from a monomer mixture containing a major proportion by weight of vinyl chloride and (2) a graft copolymer obtained from a halogen-containing trunk polymer by grafting with a mutually polymerisable monomer mixture comprising (A) a conjugated diolefine, (B) at least one monovinyl monomer and (C) a minor proportion, based on the total weight of components (A), (B) and (C), of at least one copolymerisable divinyl monomer.

The conjugated diolefine may be, for example, butadiene, isoprene, chloro- and multichlorobutadienes and dimethyl 2, 3-butadiene.

As examples of monovinyl monomers there may be mentioned acrylonitrile, methacrylonitrile, alkyl esters of acrylic acids, chloracrylic esters, styrene, alkyl and allyl methacrylates.

A suitable divinyl monomer may be, for example, divinyl benzene, ethylene glycol dimethacrylate, divinyl ether or divinyl sulphide.

Grafting is preferably carried out according to the methods described in French Patent No. 1,309,809 or No. 1,276,804. The trunk polymer used in the grafting operation is preferably polyvinyl chloride or a vinyl chloride copolymer prepared by a preliminary operation, for example, emulsion polymerised polyvinyl chloride. The ratio of the amount of trunk polymer to the grafting monomers is not critical but the weight of the grafted monomers is preferably in the range 10 to 70 percent by weight of the total weight of the graft. The composition of the monomer mixture used in the grafting operation is dependent on the polar character of the monovinyl monomer or monomers chosen; it can, however, be generally stated that the monovinyl component should constitute from 10 to 80% by weight of the mixture, the balance being the conjugated diolefine and divinyl monomers. Advantageously the divinyl monomer constitutes from 0.5 to 5% by weight of the total weight of the monomer mixture.

If the monovinyl monomer or monomers used for the preparation of the grafts do not yield rubbery products when polymerised alone, the weight of conjugated diolefine used is preferably greater than the weight of monovinyl monomer or monomers. When, however, the monovinyl monomer or monomers yield rubber products when polymerised alone, the weight of the conjugated diolefine may be less than the weight of monovinyl monomer or monomers.

The vinyl chloride homopolymer or copolymer (1) that is blended with the graft copolymer (2) in the blends of the present invention may be polyvinyl chloride or a copolymer of vinyl chloride of the emulsion or mass or suspension polymerised type. It has been found that the blends containing the suspension or mass polymerised polyvinyl chloride or vinyl chloride copolymers possess an especially high degree of clarity. The copolymers of vinyl chloride used in the present invention are obtained from monomer mixtures that advantageously contain over 80 percent by weight of vinyl chloride. As examples of vinyl chloride copolymers there may be mentioned copolymers of vinyl chloride with vinylidene chloride and, more especially, copolymers of vinyl chloride with vinyl acetate.

Instead of the vinyl chloride homopolymer or copolymer (1) there may be used a chlorinated vinyl chloride homopolymer or copolymer. Such chlorinated vinyl chloride homopolymers or copolymers may be made by the method described in our application No. 41,089/61. The blends according to the present invention may also contain minor proportions of, for example, plasticisers, thermal and light stabilisers, lubricants, processing aids, including polymeric processing aids, fillers, pigments and other colourants.

The compounding may be carried out, for example, on a mill, in an internal mixer, for example a Banbury mixer, or in an extruder which is efficient in mixing polymeric materials. The blends may also be compounded by mixing a polyvinyl chloride or vinyl chloride copolymer suspension with the graft polymer in suspended form, the whole suspension then being spray dried or coagulated together and dried and finally worked, for example, in a Banbury mixer.

The blends produced by the present invention have the advantages of being cheap, transparent or translucent and non-flammable. They also exhibit marked resistance to a wide variety of chemical reagents.

The blends of polyvinyl chloride, copolymers of vinyl chloride or chlorinated vinyl chloride homopolymers or copolymers with the graft materials lend themselves to processing by means of techniques commonly used with thermoplastic materials. For example, they may be calendered into films which are suitable for packaging and covering purposes. By heating such films under pressure between highly polished metal plates, sheets of excellent surface finish, high strength, and valuable forming and fabrication properties may be obtained, either from single plies of sheet or by lamination of several plies. The blends may also be extruded to form, for example, films, sheets, rods, tubes and profiled sections, which may rapidly be shaped and fabricated. Injection or compression moulding, for instance, of pellets formed by chopping extruded rod, may be carried out to give articles of high impact strength. The shaped structures formed from the blends produced by the process of the present invention are rigid or semi-rigid and are dimensionally stable.

The following are two types of composition which exemplify the process of the present invention.

(1) Tough, easy processing rigid blends based on low K-value vinyl chloride homopolymers or copolymers.

These blends may be made by blending the graft copolymers described above with a vinyl chloride homopolymer or copolymer and such additives as, for example, stabilising agents, pigments and lubricants but preferably excluding plasticisers for vinyl chloride polymers. The vinyl chloride homopolymer or copolymer blended with the graft copolymer should preferably have a Fikentscher K-value (calculated from the specific viscosity (at 25° C.) of solutions of 1.0 gram of the polymer or copolymer in one decilitre of cyclohexanone) of 50 to 65. The choice of K-value of the vinyl chloride homopolymer or copolymer depends on the balance of impact properties and melt flow characteristics desired, since, as the K-value is reduced both the melt viscosity and the impact strength tend to decrease. A useful combination of properties can be achieved with a polymer or copolymer having a K-value of, for example, 60.

In general, vinyl chloride homopolymers are preferred to give blends with good impact resistance and a resistance to a wide range of chemical reagents. If, however, copolymers of vinyl chloride with, for example, vinyl acetate are used, the proportion of vinyl chloride in the copolymer is preferably greater than 90 percent by weight.

The proportion of graft copolymer in these blends may be such that the final blend contains from 2 to 25 percent by weight, preferably 5 to 15 percent by weight of the polymerised grafting monomers. The total weight of graft copolymer in the blend is advantageously less than the weight of vinyl chloride homoplymer or copolymer.

These blends have impact strengths which may be almost as high as those observed in blends of polyvinyl chloride graft copolymers prepared as described in the present invention but with the omission of the divinyl monomer from the grafting monomers and high K-value vinyl chloride polymers. Moreover, blends of the present invention may also have low melt viscosities which enable them to be processed at lower temperatures than blends manufactured from high K-value vinyl chloride homopolymers or copolymers containing more than 95 percent by weight of vinyl chloride. The stabilization of blends of the present invention is consequently much easier and it is possible to produce cheaper high impact strength compositions by incorporating proportionally smaller amounts of stabilizing agents.

Furthermore, the low melt viscosity of these blends greatly facilitates the processing by, for example, extrusion or injection moulding and enables processes to be carried out which were not possible with blends based on high K-value vinyl chloride polymers, for example, blow moulding to high blowing ratios.

(2) Tough rigid blends based on high K-value polymers or coplymers, which are relatively easy to process.

These blends may be made by blending the graft copolymers described above with a homopolymer or copolymer of vinyl chloride and such additives as, for example, stabilizing agents, pigments and lubricants. The vinyl chloride homopolymer or copolymer blended with the graft copolymer can have a Fikentscher K-value defined as above 65 to 75, and can be a homopolymer of vinyl chloride or a copolymer with, for example, vinyl acetate which contains more than 80 percent by weight vinyl chloride.

The proportion of graft copolymer in these blends can be such that the final blend contains from 2 to 25 percent by weight, preferably 5 to 15 percent by weight, of the polymerised grafting monomers. The total weight of graft copolymer in the blend is advantageously less than that of the vinyl chloride homopolymer or copolymer.

These blends have the advantage of giving compositions of high impact strength with relatively small proportions of vinyl chloride graft copolymer. Moreover, although the blends have relatively high melt viscosities and are consequently more difficult to process than blends based on low K-value vinyl chloride polymers, they can be fluxed easily, for instance on a two roll mill and can be processed more easily, for instance, by extrusion, to give a smooth surface profile, than blends based on graft copolymers in which the divinyl monomer is omitted.

The following examples illustrate the present invention, the parts being by weight. "Corvic" and "Geon," where used in the examples, are registered trademarks.

*Examples 1 and 2*

In separate experiments, two premixes were prepared by intimately mixing the following ingredients.

| | Example No. 1, parts | Example No. 2, parts |
|---|---|---|
| Corvic H55/34 | 100 | 100 |
| Mellite 131 | 2 | 2 |
| Wax OP | 0.5 | 0.5 |
| Polyvinyl chloride graft A | 20 | |
| Polyvinyl chloride graft B | | 20 |

Corvic H55/34 is a commercial homopolymer of vinyl chloride by an emulsion polmerisation process and has a Fikentscher K-value, determined as previously described, of 60. Mellite 131 is an organo-tin compound and Wax OP is a modified montan lubricating wax.

Polyvinyl chloride graft A was synthesised from polyvinyl chloride, butadiene and acrylonitrile in the relative proportions of 5:4:1. Polyvinyl chloride graft B was synthesised from polyvinyl chloride, butadiene, acrylonitrile and divinyl benzene, the relative proportions of polyvinyl chloride, butadiene and acrylonitrile were 5:4:1, and the amount of divinyl benzene included in the mixture of monomers used for grafting was 2 percent by weight of the total weight of butadiene and acrylonitrile.

The respective premixes were fluxed separately on a close set two roll mill, the surface temperature of one roll being 130° C. and the surface temperature of the other being 140° C., an intimate dispersion of the components of each blend being produced by working on the mill for about five minutes. After working the blends were removed from the rolls in the form of sheets which were compression moulded in standard test moulds for 5 minutes at 180° C. under pressure. After cooling in the mould, the moulded stock was machined to the required tolerance to give samples suitable for testing. The Izod notched impact strength was determined for each of the blends according to the procedure described in British Standard 2782 method 306A, and softening point determination according to British Standard 2782 Part I method 120C. The following table gives the results obtained in these tests.

|  | Example No. 1 | Example No. 2 |
|---|---|---|
| Izod Impact Strength, ft. lb./in. notch | 6.17 | 27.87 |
| Softening Point (° C.) | 75 | 76 |

*Examples 3 and 4*

In separate experiments, premixes were made up of the following ingredients:

|  | Example No. 3, parts | Example No. 4, parts |
|---|---|---|
| Geon 113 | 100 | 100 |
| Mellite 139 | 3 | 3 |
| Calcium stearate | 2 | 2 |
| Polyvinyl chloride graft A | 15 |  |
| Polyvinyl chloride graft B |  | 15 |

Geon 113 is a commercial homopolymer of vinyl chloride manufactured by a suspension polymerisation process and has a Fikentscher K-value determined as previously described of 68. Mellite 139 is an organo-tin compound. The polyvinyl chloride graft copolymers A and B respectively are as described in Examples 1 and 2.

The respective premixes were flushed separately on a close set two roll mill, the surface temperature of one roll being 170° C. and the surface temperature of the other roll 180° C., an intimate dispersion of the components of each blend being produced by working on the mill for about five minutes. After working the blends were removed from the rolls in the form of sheets. It was observed that the premix containing Graft B fluxed much more rapidly on the mill than that containing Graft A.

Portions of these sheets were compression moulded and machined as described in Example 1 to give samples for testing the results of these tests being given in the table below.

|  | Example No. 3 | Example No. 4 |
|---|---|---|
| Izod Impact Strength, ft. lb./in. notch | 25.3 | 25.4 |

Separate portions of each of the milled sheets obtained from the respective blends were also chopped up to give small granules which were fed into an extruder. The extruder had a barrel with an internal diameter of 1 inch and was fitted with a screw having a length of diameter ratio of 15:1 and a compression ratio of 2:1. A tubehead die was used having an internal diameter of 0.1875 inch and an external diameter of 0.350 inch, the temperature gradient from the feed end of the barrel to the tip of the die arranged to increase from 135 to 180° C.

It was observed that when granules were fed into the extruder from the blend containing Graft A the extruded tube had a rough matt surface. However, the granules from the blend containing Graft B gave a good tube with a smooth glossy surface.

*Example 5*

In separate experiments, two premixes were prepared by intimately mixing the following ingredients:

|  | Example 5, parts | Control, parts |
|---|---|---|
| Chlorinated polyvinyl chloride | 100 | 100 |
| Polyvinyl chloride graft B | 15 |  |
| Mellite 139 | 3 | 3 |
| Wax OP | ½ | ½ |

The chlorinated polyvinyl chloride was polyvinyl chloride further chlorinated in suspension to give a product having a specific gravity at 23° C. of 1.560 and the polyvinyl chloride graft copolymer B was as described in Example 1.

The premixes were fluxed on a close set two roll mill, the surface temperature of one roll being 185° C. and the surface temperature of the other roll 190° C., an intimate dispersion of the components of the blend being produced by working on the mill for about 5 minutes. After working, the blends were removed from the rolls in the form of sheets, portions of which were compression moulded and machined as described in Example 1 to give samples for testing.

The Charpy notched impact strength was determined according to the method described in "British Plastics" April 1959, page 158. The following table gives the test results obtained.

|  | Example 5 | Control |
|---|---|---|
| Charpy Impact Strength, ft. lb./in. notch | 0.61 | 0.25 |
| Softening Point (° C.) | 117 | 118 |

*Examples 6 and 7*

In separate experiments, two premixes were prepared by blending the following ingredients:

|  | Example No. 6, parts | Example No. 7, parts |
|---|---|---|
| Corvic R51/83 | 100 | 100 |
| Mellite 131 | 2 | 2 |
| Wax OP | 0.5 | 0.5 |
| Polyvinyl chloride graft A | 20 |  |
| Polyvinyl chloride graft B |  | 20 |

Corvic R51/83 is a commercial copolymer of vinyl chloride and vinyl acetate in the relative proportions of 87:13 and has a Fikentscher K-value of 60. The other components of this blend are as described in Examples 1 and 2.

The respective premixes were fluxed separately on a close set two roll mill, the surface temperature of one roll being 130° C. and of the other being 140° C., an intimate dispersion of the components of each blend being produced by working on the mill for about five minutes. After working the blends were compression moulded and the mouldings produced were used for Izod impact strength and softening point determinations as described in Examples 1 and 2. The following table gives the results obatined in these tests:

|  | Example No. 6 | Example No. 7 |
|---|---|---|
| Izod impact strength, ft. lb./in. notch | 2.96 | 8.9 |
| Softening point (° C.) | 68.5 | 70.0 |

I claim:
1. A polymer blend consisting essentially of (1) a vinyl chloride polymer selected from the group consisting of polyvinyl chloride, chlorinated polyvinyl chloride and vinyl chloride copolymers obtained from a monomer mixture containing at least 80% by weight of vinyl chloride and at least one copolymerizable monomer, and at most an equal weight of (2) a graft copolymer comprising a polyvinyl chloride trunk polymer to which has been grafted a monomer mixture comprising butadiene, acrylonitrile and divinyl benzene, the divinyl benzene constituting from 0.5 to 5.0% of the total weight of the monomer mixture.

2. A polymer blend consisting essentially of (1) polyvinyl chloride and (2) a polyvinyl chloride trunk polymer to which has been grafted a monomer mixture comprising butadiene, acrylonitrile and divinyl benzene, the weight of component (2) constituting from 10 to 30% of the weight of component (1).

3. A polymer blend according to claim 2, in which the weights of the polyvinyl chloride trunk polymer, butadiene, acrylonitrile and divinyl benzene are in the ratio 50:40:10:1.

4. A polymer blend according to claim 2, in which the polyvinyl chloride component (1) has a Fikentscher K-value, calculated from the specific viscosity at 25% C. of a solution of one gram of the polymer is one decilitre of cyclohexanone, of from 50 to 65.

5. A polymer blend according to claim 2, in which the polyvinyl chloride component (1) has a Fikentscher K-value, calculated from the specific viscosity at 25° C. of a solution of one gram of the polymer in one decilitre of cyclohexanone of from 50 to 65.

References Cited by the Examiner

UNITED STATES PATENTS 3,167,598  1/1965  Heaps et al. _____ 260—876

FOREIGN PATENTS 1,276,804  10/1961  France.
1,307,117  9/1962  France.

MURRAY TILLMAN, *Primary Examiner.*

G. F. LESMES, *Assistant Examiner.*